US010942281B2

(12) United States Patent
Laurichesse et al.

(10) Patent No.: US 10,942,281 B2
(45) Date of Patent: Mar. 9, 2021

(54) GNSS RECEIVER USING A COMBINATION OF VELOCITY INTEGRATION AND PRECISE POINT POSITIONING

(71) Applicant: CENTRE NATIONAL D'ETUDES SPATIALES, Paris (FR)

(72) Inventors: Denis Laurichesse, Tournefeuille (FR); François-Xavier Marmet, Muret (FR); Lionel Ries, Viviers les Montagnes (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 114 days.

(21) Appl. No.: 16/089,814

(22) PCT Filed: Mar. 31, 2017

(86) PCT No.: PCT/EP2017/057645
§ 371 (c)(1),
(2) Date: Sep. 28, 2018

(87) PCT Pub. No.: WO2017/167943
PCT Pub. Date: Oct. 5, 2017

(65) Prior Publication Data
US 2019/0094385 A1 Mar. 28, 2019

(30) Foreign Application Priority Data

Apr. 1, 2016 (EP) ..................................... 16305387

(51) Int. Cl.
*G01S 19/22* (2010.01)
*G01S 19/42* (2010.01)
(Continued)

(52) U.S. Cl.
CPC ............ *G01S 19/426* (2013.01); *G01S 19/22* (2013.01); *G01S 19/32* (2013.01); *G01S 19/46* (2013.01); *G01S 19/47* (2013.01); *G01S 19/52* (2013.01)

(58) Field of Classification Search
CPC ........ G01S 19/426; G01S 19/22; G01S 19/32; G01S 19/42; G01S 19/28; G01S 19/09; G01S 19/24; G01S 5/0027
(Continued)

(56) References Cited

U.S. PATENT DOCUMENTS 5,375,059 A 12/1994 Kyrtsos et al.
6,181,275 B1 1/2001 Chenebault et al.
(Continued)

FOREIGN PATENT DOCUMENTS

EP 2023084 A2 2/2009
EP 3226034 A1 10/2017
(Continued)

OTHER PUBLICATIONS

Bhuiyan et al, "Advanced Multipath Mitigation Techniques for Satellite-Based Positioning Applications", International Journal of Navigation and Observation, vol. 2010, Article ID 412393.
(Continued)

*Primary Examiner* — Harry K Liu
(74) *Attorney, Agent, or Firm* — Meagher Emanuel Laks Goldberg & Liao, LLP

(57) ABSTRACT

The invention discloses an improved GNSS receiver which determines a location of the receiver by combining a first location determined either from the standard PVT of a multi-frequency receiver and/or from a positioning aid like a map matching algorithm, inertial navigation system, WiFi localization system or other, and a second location determined by integrating the velocity from the standard PVT.
(Continued)

The combination is based on a duty cycle or a combination of the duty cycle with a weighting of the error budgets of the first position and the second location. The improved receiver is preferably based on a standard receiver with an add-on software module which receives and processes data transmitted from the standard receiver by, for example, NMEA messages. The improved receiver allows a determination of a more precise and smoother trajectory in a simple way.

21 Claims, 8 Drawing Sheets

(51) Int. Cl.
G01S 19/32 (2010.01)
G01S 19/46 (2010.01)
G01S 19/47 (2010.01)
G01S 19/52 (2010.01)

(58) Field of Classification Search
USPC .................................................. 342/357.25
See application file for complete search history.

(56) References Cited

U.S. PATENT DOCUMENTS

2005/0259003 A1  11/2005  Wakamatsu
2008/0268872 A1  10/2008  Rofougaran
2013/0069822 A1*  3/2013  Wu .......................... G01S 19/55
                                                          342/357.24
2014/0277956 A1*  9/2014  Morin .................. G01C 21/165
                                                          701/50

FOREIGN PATENT DOCUMENTS

GB        2322989 GB          9/1998
JP        2006317241 A       11/2006
WO        WO-2010021658 A2 *  2/2010  ............. G01S 19/44
WO        WO2016/034622 A1    3/2016

OTHER PUBLICATIONS

J. Zhang, «Precise Velocity and Acceleration Determination Using a Standalone GPS Receiver in Real Time», PhD thesis, Aug. 20, 2002, RMIT, School of Mathematical and Geospatial Sciences Royal Melbourne Institute of Technology, Australia.
http://www.gpspower.net/garmin-tutorials/141052-secret-startup-commands-hidden-menus-garmin-devices.html accessed 2015.
http://indico.ictp.it/event/a12180/session/8/contribution/5/material/0/0.pdf ICTP International Centre for Theoretical Physics; Workshop on GNSS Data Application to Low Latitude Ionospheric Research; May 6-17, 2013.
International Search Report for PCT/EP2017/057645 , dated Aug. 29, 2017.
European Office Action for corresponding EP Application 16305387.9 dated May 19, 2020.
English Translation of Kenichi Koike: "Improvement in accuracy of position of GPS receiver", IEICE Technical Report, Denshi Jouhou Tsuushin Gakkai, JP, vol. 103, No. 544 (ITS2003-48, MoMuC2003-92) Jan. 7, 2004, (Jan. 7, 2004), pp. 33-38.

* cited by examiner

LOS signals
Non-LOS signals

| Error Source | One-signal Error (meters) | | |
|---|---|---|---|
| | Bias | Random | Total |
| Ephemeris | 0.8 | 0.0 | 0.8 |
| Satellite clock | 1.0 | 0.0 | 1.0 |
| Ionosphere | 0.1 | 0.0 | 0.1 |
| Troposphere | 0.2 | 0.0 | 0.2 |
| Multipath | 0.2 | 0.2 | 0.3 |
| Receiver noise | 0.0 | 0.1 | 0.1 |
| | | | |
| User equivalent range error, rms | 1.3 | 0.2 | 1.3 |
| Filtered UERE, rms | 1.3 | 0.1 | 1.3 |
| Vertical one-signal errors - VDOP = 1.7 | | | 2.3 |
| Horizontal one-sigma errors - HDOP = 1.0 | | | 1.3 |

GPS dual-freq UERE
« position »

FIG.3a

| | Error Terms | Magnitude Estimated |
|---|---|---|
| Satellite Orbit | Broadcast Ephemeris | ±1mm/s |
| Satellite Clock | Satellite Clock Correction | Negligible |
| | $L_1$-$L_2$ Correction (Group delay) | Negligible |
| Relativity | Orbit Eccentricity | Several cm/s |
| | Sagnac | Several mm/s |
| | Receiver Potential difference | Sub-mm/s |
| | Secondary Relativistic Effects | Negligible |
| Atmosphere | Ionospheric Correction | mm/s ~ cm/s |
| | Tropospheric Correction | mm/s ~ cm/s |
| Receiver | Receiver Site Displacement | Negligible |
| | Multipath Correction | Negligible |
| | Receiver Clock | |

GPS L1C/A UERRE
« velocity »

FIG.3b

GNSS RECEIVER USING A COMBINATION OF VELOCITY INTEGRATION AND PRECISE POINT POSITIONING

FIELD OF THE INVENTION

The invention relates to a GNSS receiver. More specifically the GNSS receiver of the invention provides improved navigation accuracy and smoothness, notably in urban canyons, without a need to use complex multipath mitigation techniques and/or external aiding data.

BACKGROUND

The use of navigation receivers becomes increasingly pervasive in everyday life. It is all the more common that cars' on-board electronics, smart phones, tablets include navigation receivers, and that applications running thereon capture as input information on position and trajectory of the user of the terminal.

Navigation receivers rely on L-Band RF signals transmitted by Medium Earth Orbiting satellites, which are generally included in constellations comprising tens of them to cover most of the surface of the earth, such as the GPS™ (US), Galileo™ (Europe), Glonass™ (Russia) and Beidou™ (China). These constellations are designated under the generic acronym of GNSS (Global Navigation Satellite System).

GNSS carrier signals are modulated by a pseudo-random code and a navigation message that allow calculation of a pseudo-range between the receiver and a specific satellite. With a minimum of four pseudo-ranges, it is possible to calculate Position, Velocity and Time (PVT) of the receiver. In receivers of the type used by consumers, the position information is the one which is directly used to compute the navigation solution.

PVT measurements are affected by a number of errors, some of which are intrinsic to the principle of measurement used (i.e, due to the deviation in trajectory of the RF signals through the atmosphere—ionosphere and troposphere—due to variations in the orbits of the satellites), intrinsic to the receiver and satellites imperfections (clock biases for instance), or intrinsic to some configurations of the satellites in view at a moment in time (i.e. elevation of the satellites over the horizon; low dispersion of visible satellites—high Dilution of Precision or DOP). A number of corrections may be used to mitigate these errors, with the use of specific processing techniques which are only available to certain types of receivers. For instance, dual-frequency receivers can mitigate ionospheric errors with a gain of precision from a few tens of meters to a few meters, and even better when combined with precise satellite orbits and clocks which then provide Precise Point Positioning (PPP)—a precision of a few tens of centimetres. Differential GPS and Real Time Kinematics solutions provide similar precision from integration of outside information (relative positioning vis-à-vis a number of fixed reference stations with known positions).

It is more difficult to mitigate in a consistent and efficient manner some errors which depend on the position of the receiver, notably when this position is surrounded by a number of objects which reflect the navigation RF signals and/or mask a number of the satellites which should be in line of sight (LOS) at a moment in time. In such conditions, the precision of the calculation of the PVT may be quite poor, all other causes of errors being equal, both at the time of acquiring a GNSS signal and at the time of tracking said signal.

In urban canyons (i.e. streets in between tall buildings), multipath will not only increase the error in the determination of the pseudo-range of a satellite (User Equivalent Range Error or UERE), but also the (Geometric) Dilution Of Precision, (GDOP or DOP), because the field of view of the antenna will be narrower thus limiting the increase in precision due to the use of additional satellites.

The degradation in UERE is due to the signal impairments of the specific satellite which is acquired or tracked by a tracking loop. Tracking of a satellite relies on a maximization of a correlation function between the acquired code signal and a number of local replicas generated by the receiver of the code signals which are specific to each satellite. The correlation functions will be corrupted by multipath and the satellite may not be correctly acquired or may be lost. Even if the signal tracking is still achievable, signal impairments will affect the correlation function's shape, thus degrading the pseudo-range estimation, and the UERE.

Most of the mitigation techniques therefore rely on specific processing applied at the correlation stage. For a general overview of these prior art techniques which can be applied, see for instance Bhuiyan et al, Advanced Multipath Mitigation Techniques for Satellite-Based Positioning Applications, International Journal of Navigation and Observation, Volume 2010, Article ID 412393. Among these techniques are: using narrow correlators (i.e. correlators spaced by much less than a chip—or code length); using numerous correlators per tracking channel instead of a standard number of three and performing a double delta calculation; Multipath Estimation Delay Lock Loop, which uses the output of the correlation functions to estimate a full navigation signal of a definite satellite comprising LOS and non LOS signals.

All these solutions are complex and costly to implement either at the hardware level or at the software level. In any case, they cannot be currently implemented in a standard consumer receiver of the type used in a smart phone or a car navigation system.

A solution to mitigate the effects of multipath or other kinds of impairments to a navigation solution (e.g. strong local ionospheric disturbances impairing signal from one or several satellites) that could be implemented in a standard receiver available to the general public has been disclosed in European patent application filed under n° EP16305387.9 in the name of the applicant of the instant application. In a receiver of this type, the navigation solution is calculated by combining an instantaneous calculated first location with a second location calculated from an integration of the velocity measurements. The combination of the first and the second locations is a weighted average wherein the weights are defined by the error budgets of the two calculated locations.

But it is difficult to achieve 10-cm level precision or better with a single frequency solution. To achieve such a precision, using a PPP approach is a preferred option. PPP receivers have so far not been introduced on the consumer market of standalone devices, in part because of hardware cost consideration, but moreover because they drain much higher power from the batteries of the device (more than 15 times).

The present invention discloses a solution to overcome the previously cited drawbacks.

SUMMARY OF THE INVENTION

To this effect, the invention discloses notably a GNSS receiver which is configured, in a number of its embodiments, to use velocity measurements most of the time and dual frequency (or higher number of frequencies) PPP measurements at certain moments in time.

More precisely, this invention discloses a GNSS receiver comprising: first computing logic configured to calculate a first location and a second location of the GNSS receiver, the first location based on position data in a PVT vector and calculated on one or more channels from a plurality of GNSS signals operating at two or more frequencies, the second location based on a result of an integration of velocity data in the PVT vector and calculated on the one or more channels from GNSS signals each operating at a single frequency; second computing logic configured to determine one or more weighting factors of the first location and the second location and to cause the first computing logic to output a calculated location of the GNSS receiver as a weighted average of the first location and the second location.

Advantageously, the one or more weighting factors comprise a time cycle.

Advantageously, the time cycle is predetermined based on an average duration of validity of an atmospheric correction.

Advantageously, the predetermined time cycle is in-between 60 s and 300 s.

Advantageously, the first weight is set to zero and the second weight is set to one in-between two successive instants of the predetermined time cycle, while the first weight is set to one and the second weight is set to zero at said two successive instants.

Advantageously, the second computing logic is further configured to estimate a first error budget of the first location and a second weight of the second location and the one or more weighting factors are calculated by one or more of the first computing logic or the second computing logic, based on one or more of a predetermined time cycle, the first error budget or the second error budget.

Advantageously, a first weight of the first location in the calculated location equals a proportion of the first error budget in the total of the first error budget and the second error budget and a second weight of the second location in the calculated location equals a proportion of the second error budget in the total of the first error budget and the second error budget.

Advantageously, the first weight equals a hundred percent if the first error budget is lower than or equal to a combination of the second error budget and a first threshold value, Advantageously, the second weight equals a hundred percent if the second error budget is lower than a combination of the first error budget and a second threshold value.

Advantageously, the second location uses, based on a decision criterion, one or more of: i) a calculated location of the GNSS receiver at an epoch before a current epoch as an initial value of the integration of the velocity data in the PVT vector or ii) a location of the GNSS receiver at a previous epoch input from positioning aids as an initial value of the integration of the velocity data in the PVT vector.

Advantageously, the positioning aids comprise one or more of a map matching algorithm, an output of an inertial navigation system or a Wi-Fi localization system.

Advantageously, the estimated error budgets depend upon one or more of a configuration of said GNSS receiver, a geometry of GNSS satellites in view of said GNSS receiver or a topology in an environment of said GNSS receiver.

Advantageously, the estimated error budgets are estimated based on one or more of a Dilution Of Precision (DOP), a User Equivalent Range Error (UERE), a User Equivalent Range Rate Error (UERRE) or a probability estimate of a random walk of the integrated velocity along its path between a previous epoch and a current epoch.

Advantageously, the first error budget equals the DOP multiplied by the UERE.

Advantageously, the second error budget equals a product of the DOP multiplied by the UERRE, times the duration during which velocity has been integrated.

Advantageously, the probability estimate of the random walk of the integrated velocity is modeled by an ellipsoid.

Advantageously, one or more of the UERE and the UERRE are a combination of one or more of a parameter value, a carrier to noise ratio dependent value, an elevation dependent value or a signal dependent value.

Advantageously, one or more of the first error budget or the second error budget are forecast estimated error budgets, said forecast being based on a combination of an estimated future trajectory of the GNSS receiver and a probability on said estimated future trajectory of one or more of a configuration of said GNSS receiver, a geometry of GNSS satellites in view of said GNSS receiver or a topology in an environment of said GNSS receiver.

Advantageously, one or more of the UERE and the UERRE are predefined and stored in a database accessible by the first computing logic.

Advantageously, the receiver of the invention further comprises a third computing logic configured to calculate a heading information from the PVT vector.

The invention also discloses a localization method using a GNSS receiver, the method comprising: calculating a first location and a second location of the GNSS receiver, the first location based on position data in a PVT vector calculated by the GNSS receiver on one or more channels from a plurality of GNSS signals operating at two or more frequencies, the second location based on a result of an integration of velocity data in the PVT vector and calculated on the one or more channels from GNSS signals each operating at a single frequency; determining one or more weighting factors of the first location and the second location and causing the first computing logic to output a calculated location of the GNSS receiver as a weighted average of the first location and the second location.

The invention is easy to implement on any two-or-more-frequency GNSS receiver. It is not even necessary to modify the receiver itself. Access to a number of data points which are normally readily accessible on standard receivers in well-known data formats (e.g. NMEA0183 or NMEA2000 protocols) will allow a GNSS receiver to practice the invention. The invention brings PPP-like order of magnitude for accuracy, both in severe and benign environments. In doing so, it does not necessarily need external data, such as augmentation data, real time kinematics or information on the topology of the environment of the receiver, but it may use them if they are available. In this case, "True PPP" measurements will be obtained, the ionospheric mitigation being based on a combination of code and phase measurements on two or more frequencies acquired at the receiver and external data providing the most up-to-date orbital corrections and satellite clock biases The receiver of the invention has a power imprint that is much lower than the power imprint of a PPP receiver (close to 10 times lower) at a cost in precision that is quite small.

BRIEF DESCRIPTION OF THE DRAWINGS

The invention and its advantages will be better understood upon reading the following detailed description of a particular embodiment, given purely by way of non-limiting example, this description being made with reference to the accompanying drawings in which:

FIGS. 3a and 3b display examples of parameters used in computations of estimated error budgets of two position and velocity measurements of a standard GNSS receiver of the invention in a number of its embodiments;

DETAILED DESCRIPTION

Figure 1:
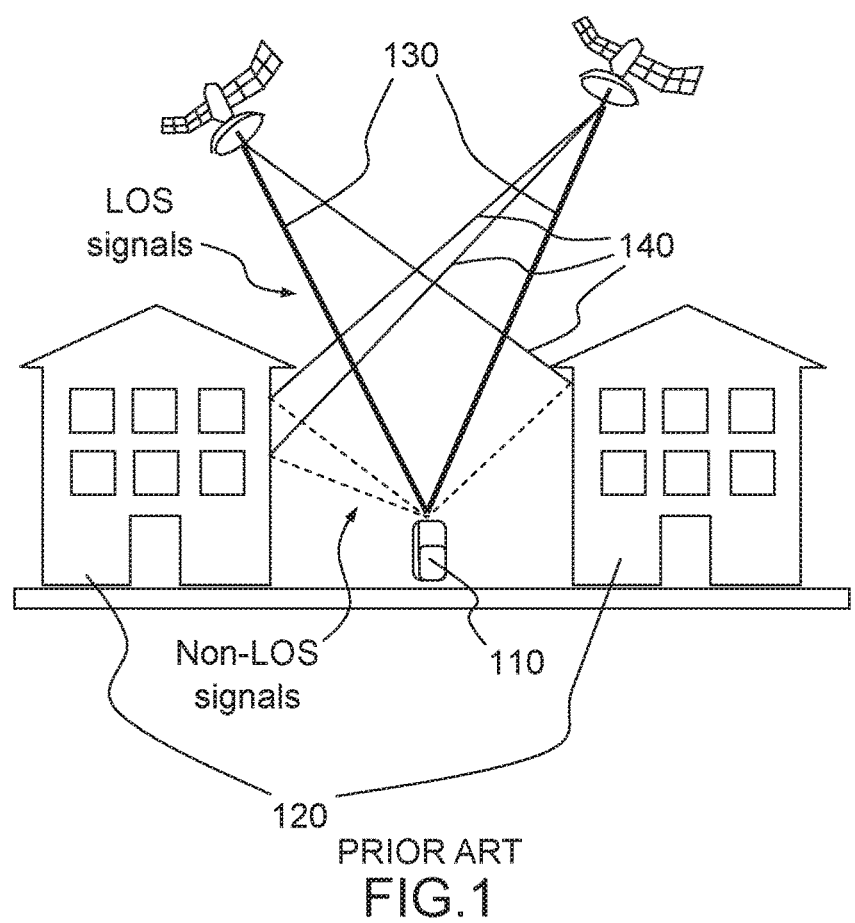
FIG. 1 illustrates the multipath problem as viewed from a GNSS receiver of the prior art.

FIG. 1 illustrates the multipath problem as viewed from a GNSS receiver of the prior art.

A receiver 110 is positioned between two buildings 120. Certain signals 130 reach the receiver in a direct line. Other signals 140 reach the receiver after having been reflected from the buildings. A standard receiver is not able to distinguish between direct signals 130 and reflected signals 140, thereby leading to a positioning error. Multipath errors at a given location of the receiver 110 will depend on the characteristics of the obstacles at the location (height, roughness of their surface, etc. . . . ) but also on the elevation of the satellites in view, and therefore on the time of the day, and on the meteorological conditions.

It is quite difficult to correct multipath errors, notably because they are location and time dependent and therefore require significant memory and/or processing power. Also, receivers which are configured or aided to cope easily with other types of errors, notably ionospheric errors, like dual-frequency receivers, are not efficient in a multipath environment, notably when a cold start is needed.

It has thus always been an issue to find a solution to this problem, as with other types of impairments which impact the error budget of a navigation solution. And even more so in a simple way which can be applied with standard GNSS receivers.

Figure 2A:
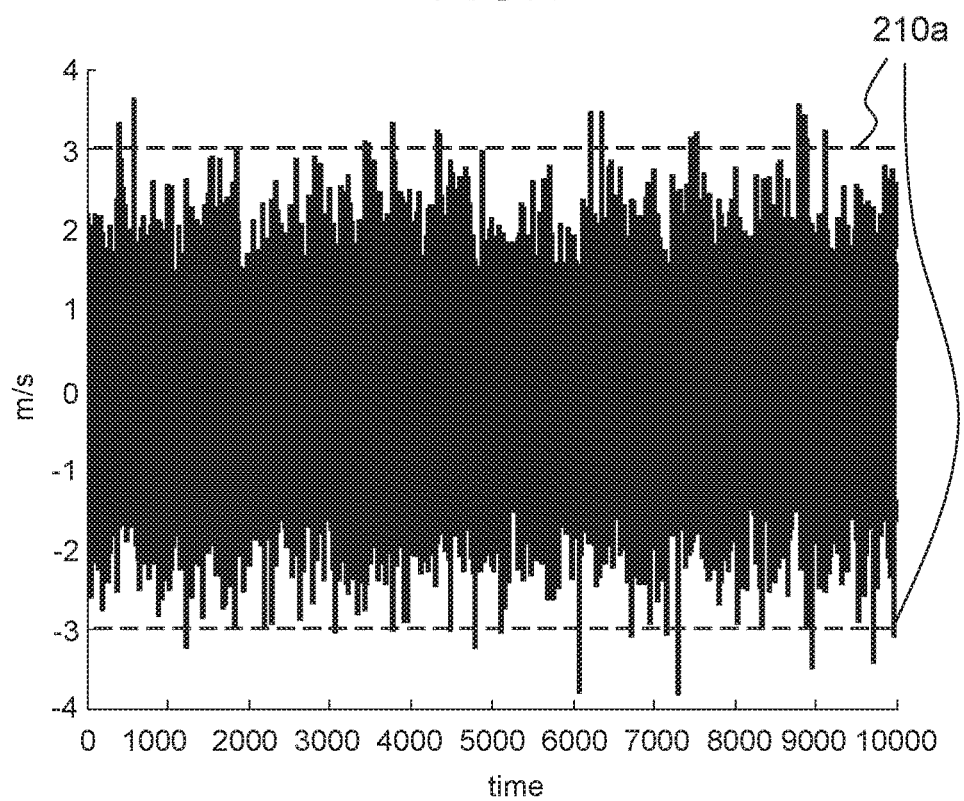
FIGS. 2a and 2b illustrate typical errors impairing velocity and velocity-based position measurements for in a GNSS receiver of the invention in a number of its embodiments.
Figure 2B:
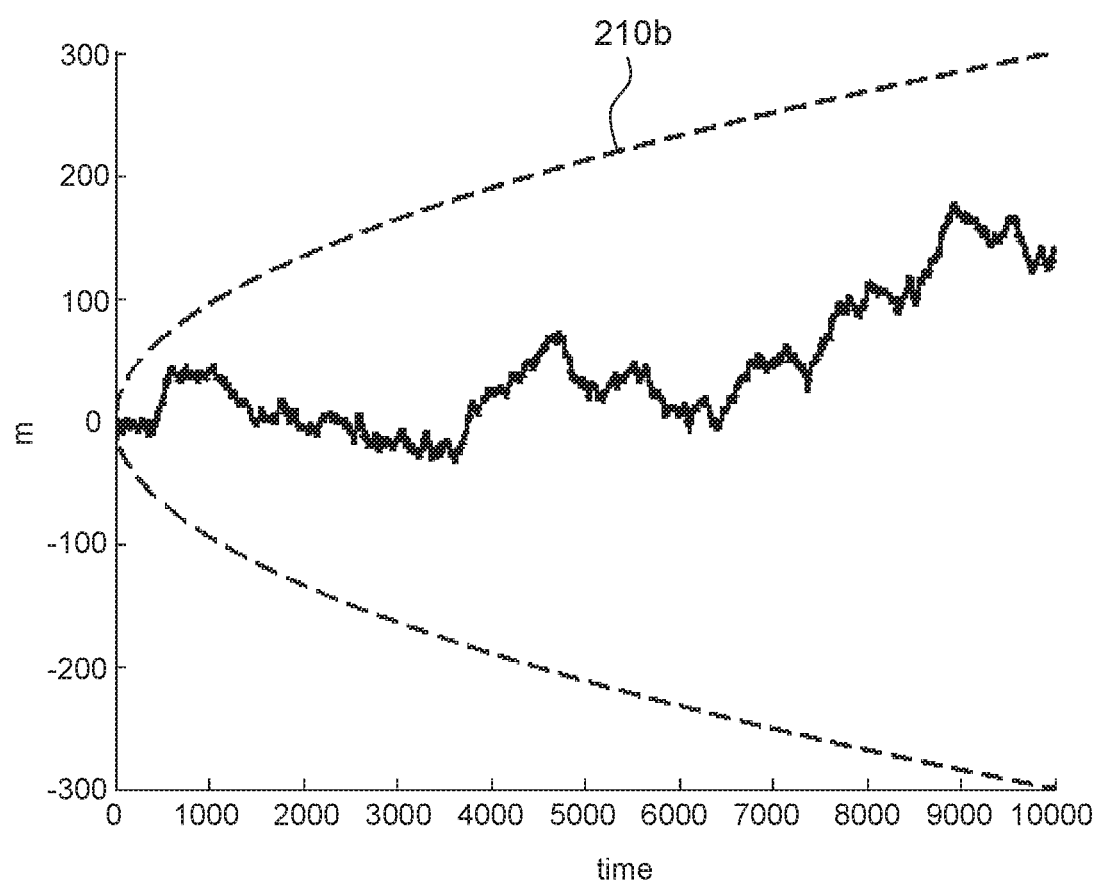

FIGS. 2a and 2b illustrate typical errors impairing velocity and velocity-based position measurements in a GNSS receiver of the invention in a number of its embodiments.

FIG. 2a displays the variations of GNSS velocity over time. Lines 210a illustrate the boundaries of the signal at 3 standard deviations (SD). GNSS velocity being a direct measurement from the pseudo-ranges between the receiver and the satellites in view, it typically has a lower error budget than velocity output by mass-market inertial sensors, this velocity coming from acceleration integration. Also, hybridization solutions between a GNSS receiver and an inertial navigation system are complex to implement (especially as a retrofit solution), and for the time being are mostly confined to professional receivers, notably in the world of avionics.

FIG. 2b displays a position calculated by integrating the velocity measurements of FIG. 2a. Line 210b illustrates the same 3 SD boundary as lines 210a. It can be seen that the position has the behavior of a random walk. Indeed, the comparison of the error budgets should be made after integration of the velocity to determine a position.

FIGS. 3a and 3b display examples of parameters used in computations of estimated error budgets of two position and velocity measurements of a standard GNSS receiver of the invention in a number of its embodiments.

FIG. 3a is taken from http://indico.ictp.it/event/a12180/session/8/contribution/5/material/0/0.pdf, to the author of which credit is given. It displays the factors which impact the position error budget, or UERE and the order of magnitude of these errors. It can be seen that the larger factor is the ionospheric effect with a possible error of 10 cm (−5/+5 cm), the satellite ephemerides, the satellite clocks, multipath distortion, tropospheric effect and carrier phase.

FIG. 3b is taken from «Precise Velocity and Acceleration Determination Using a Standalone GPS Receiver in Real Time», J. ZHANG, PhD thesis (Table 6.2), to the author of which credit is given. It displays the factors which impact the velocity error budget, or User Equivalent Range Rate Error (UERRE) and the order of magnitude of these errors. We can see that, in general, the error budget on velocity is at least one order of magnitude lower than the UERE. This is essentially due to the fact that velocity is measured from the Doppler effect. Also, even for errors which are significant, their variation is much lower. For instance, the tropospheric effect drops from an error of 30 cm to an error of an order of 1 cm/s. The multipath error becomes negligible.

According to the invention, then velocity is integrated once to create a new calculated location which has, in general, a lower error budget.

There are conditions under which the error on integrated velocity may become larger than the error on position. This may be the case for instance, when the product of the UERE×DOP becomes lower than the standard deviation of the integrated velocity, notably when the integration time is long. It is therefore quite advantageous to be able to then switch from velocity measurements to position measurements. It is also advantageous to use a precise position as an initial position for the integrated position.

Figure 4:
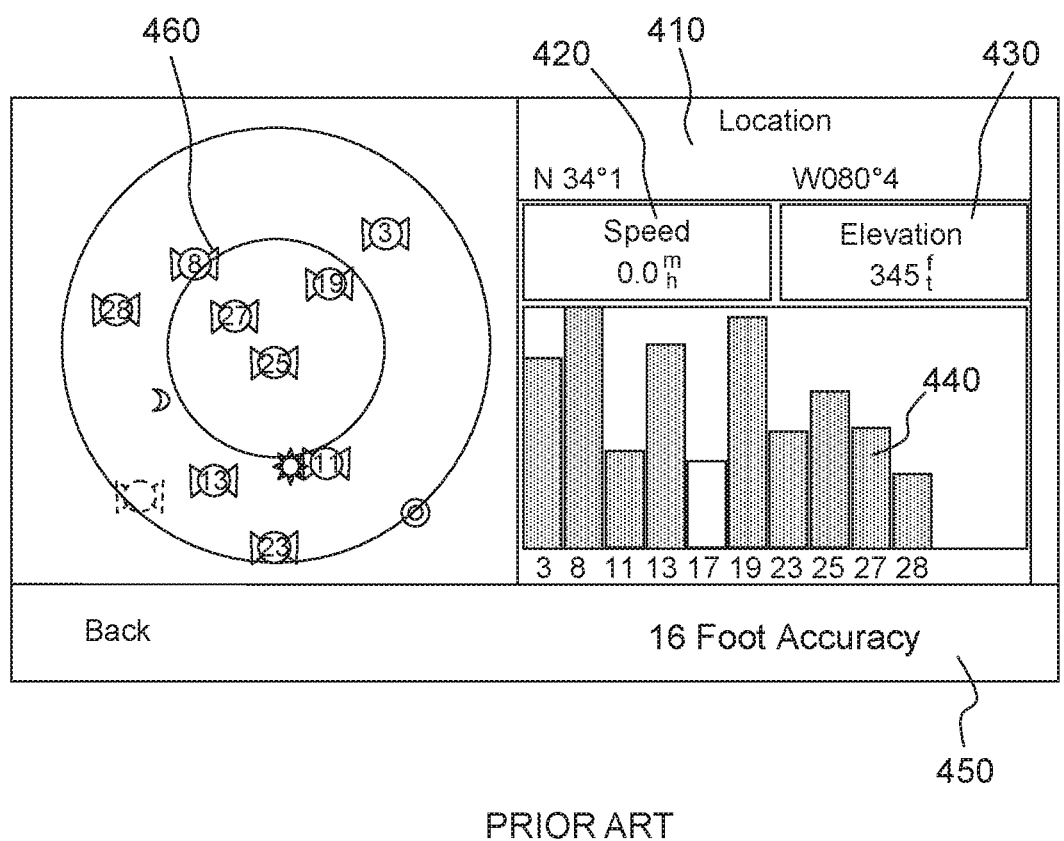
FIG. 4 represents a display of a car navigation system of the prior art.

FIG. 4 represents a display of a car navigation system of the prior art.

FIG. 4 is extracted from http://www.gpspower.net/garmin-tutorials/141052-secret-startup-commands-hidden-menus-garmin-devices.html, to the author of which credit is given.

The National Marine Electronics Association (NMEA) has defined standard sentences of a format for outputting from a GNSS receiver a large amount of information which can be used to implement the invention using a standard receiver. Two standards (NMEA 0183 and NMEA 2000) apply.

The receiver notably displays (and outputs at a port): Location, 410, Velocity, 420, C/N0, 430, for each satellite in view which is designated by a number which is characteristic of its constellation, DOP, 450, and Elevation 460. Other data may be available, like azimuth, raw pseudo-range measurements, estimated PVT residuals, among others.

Figure 5:
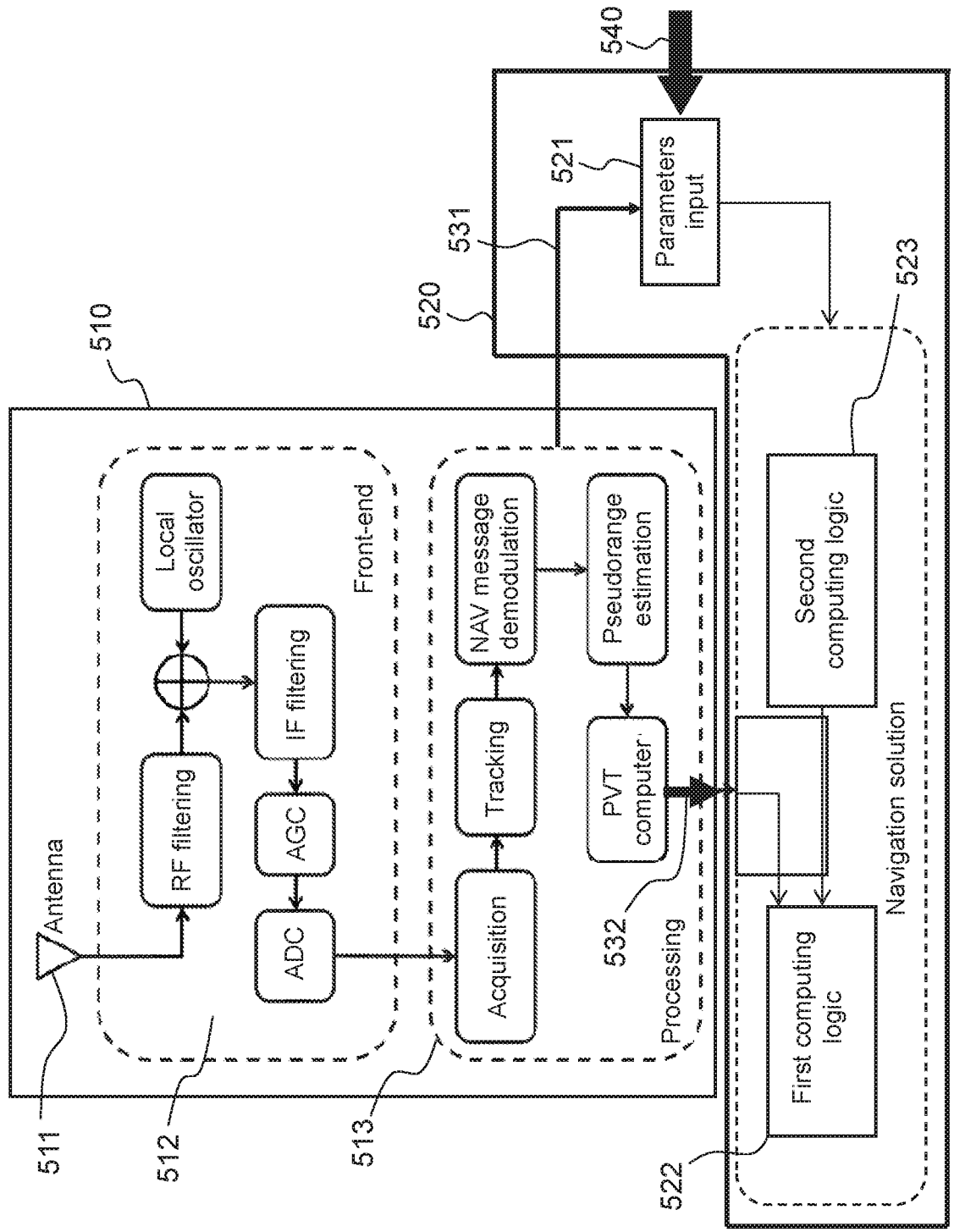
FIG. 5 represents an architecture of a GNSS receiver modified to implement the invention in a number of its embodiments.

FIG. 5 represents architecture of a GNSS receiver modified to implement the invention in a number of its embodiments.

The receiver 510 is a core GNSS receiver in accordance with the present invention with one or more antenna assemblies, 511, a number of RF processing channels, 512 and a digital processing capability, 513. To implement the invention, the receiver 510 is capable of receiving and processing multi-frequency signals. The one or more antenna assemblies 511 are configured to receive signals on at least two carrier frequencies. The RF processing channels 512 are configured to process said signals on at least two carrier frequencies. For example, in the Galileo constellation, each satellite emits positioning signals on the E1/L1 (1575.42 MHz), E5a (1176.45 MHz), E5b (1207.14 MHz) and E6 (1278.75 MHz) carrier frequencies. Using at least two frequencies allows eliminating the ionospheric errors by calculating linear combinations of the code and/or phase signals, or in a different manner, as is known by a person of ordinary skill in the field of GNSS processing. The exact composition of the core receiver may vary depending on the use case (military or professional application, vehicle navigation, pedestrian dedicated device or smart phone). It may be capable of processing signals from multiple constellations (GPS, Glonass, Beidou, Galileo, etc. The core receiver may be implemented in an FPGA or in an ASIC, or as a software-defined receiver, in multiple chips or in a single chipset.

As indicated above, the receiver 510 may output messages 531, 532 compliant with the NMEA format, or compliant with other formats, including proprietary formats defined by manufacturers. Generally, the manufacturers export their messages in their format or in NMEA format. Most of them publish the structure of the messages they output. As long as the output messages include the PVT calculated by the receiver, there will be enough information to practice the invention. Output 531 and 532 have been split with contents mentioned hereunder, but this can be physically done through a single interface.

These messages are fed to computing logic, 520 which will compute the navigation solution according to the invention, i.e. from a weighted average of a first location being the Position (P) of the calculated PVT, and a second location which is the Velocity (V) of the calculated PVT. In some embodiments, "weighted" means 100%/0% or 0%/100%, the switch between these two modes being triggered either by a duty cycle or an evolution of the quality of the P and V measurements. In other embodiments the processing logic 520 may be implemented in a hardware add-on module or in a software module loaded in a memory included in the receiver or added thereto. The software may also be obtained as an application downloaded and/or installed on a smart phone. It may also be fully integrated with the core GNSS receiver, 510, on a same board or in a same FPGA or a same ASIC.

Parameters are input, 521, both from the receiver and possibly from tables stored in a memory contained in, or adjacent to, the processing logic 520. The tables may receive data from external sources, for example a provider of positioning services. In some embodiments, some of the data may be fed directly to a parameters input data port without being stored in a table.

Parameters input from the core receiver through port 531 may include part or all of those listed in the description of FIG. 4 and other parameters which may be found useful to mix the first location and the second location, as further described below in relation with FIG. 6.

In an embodiment, the tables may include a duty cycle that triggers a shift between the first location and the second location based on a time cycle. The duty cycle may be a time cycle determined as a function of a duration of validity of the atmospheric (ionospheric and/or tropospheric) corrections. In some variants, the duration of validity of the ionospheric corrections may be comprised between 80 and 120 s.

Based on a value of a 90 s duty cycle where multi-frequency channels of the receiver are set on to compute P during 6 s and single frequency channels of the receiver are set on 84 s to compute V, the power consumption of the receiver will be about 55 mW, when the power consumption of the receiver in a bi-frequency mode is 500 mW and the power consumption of the receiver in a single frequency mode is 30 mW. Thus, an accuracy that is close to the accuracy of the receiver in a mumulti-frequency mode may be achieved while the power consumption of the device is divided by a factor that is close to 10. In some embodiments, the ratio may even be higher, if not all the channels are set to operate from time to time in a dual-frequency mode, but only a portion of them, set for instance at 4, 5 or 6, the ones selected being the ones inducing the lowest DOP.

In some embodiments of the variants, the duration of validity of the atmospheric corrections may be location dependent. In some embodiments, this duration may also be variable, based notably on a time of a day (day, night, or a split of these periods) or on meteorological conditions (sunny, cloudy, rainy wheather). In some embodiments, a smoothing factor may be applied to avoid an instantaneous shift between the first location and the second location, notably if these two locations have a distance higher than a threshold. The smoothing factor may be calculated to provide a linear, polynomial or other form of transition on the path between the first location and the second location. Data providing the necessary information may be input as parameters in the parameters input unit 521.

In other embodiments, the tables may include for instance, parameters to compute error budgets, a first error budget for the GNSS calculated position (UERE) and a second error budget (UERRE) for the GNSS calculated velocity, or an error budget for a location calculated by integrating velocity. These parameters may be preset values of UERE and UERRE. They may also comprise preset values of UERE and UERRE that depend on the satellites' elevations and/or their current C/N0 and/or the GNSS signal type. They may also comprise a configuration of the receiver (type or model of the antenna, type or model of the RF processing stage, type or model of the digital processing stage). They may also comprise tables of multipath effects at locations on a trajectory of the receiver. They may also comprise different values of thresholds which will be used to compute weights of a first location, calculated from P in PVT, and a second location, calculated from V in PVT, as provided by the invention. By way of example, for a pedestrian just looking for a coarse positioning, a maximum value of UERE of 50 m may be set so that when the actual value is higher, the P measurements are completely discarded. Likewise, a maximum value of UERRE of 1 m/s may be set. For users requiring more precision, the thresholds will be lowered.

The embodiments described above may be combined. For example, the duty/time cycle, the first error budget, the second error budget may be combined in a weighting factor of the first location and the second location. The time cycle may be set as determining a default weighting factor that is modified if the error budget of one of the two locations provides a determination that one of the two locations' accuracy is above or below a threshold. For instance, if the default duty cycle is set at 84 s V-6 s P, a P calculation may be used in lieu of the V calculation if the last V calculation is older than 42 s (or another value defined in proportion of the duty cycle as a maximum frequency of the use of the P calculations) and a ratio of the error budget of the V calculation to the error budget of the P calculation is higher than a first threshold. For instance, a ratio of an error budget of the V calculation that is higher than a threshold of twice the error budget of the P calculation. Conversely, if a P calculation was used less than 179 s ago (or another value defined in proportion of the duty cycle as a minimum frequency of the use of the P calculations), and a ratio of the error budget of the V calculation to the error budget of the P calculation, is lower than a second threshold, the use of the coming P calculation may be skipped. A threshold ratio of 2 may also be used.

In some embodiments, the duty cycle may be interrupted for causes that are external to the error budgets, for instance to enable the receiver to operate for a longer period than determined by the duty cycle in a mode wherein the calculated location is based only on the second location. This may be notably triggered if the power level of the device falls below a threshold. Information on the power level may be acquired from the device in the parameters input module 521.

The first computing logic, 522, extracts P and V from the PVT data output through port or interface 532 from the core receiver. P is a first location, obtained from a multi-frequency channel of the receiver, and a second location is computed by integrating V, V being obtained from a single frequency channel of the receiver. In an embodiment, the distance calculated from the integration of velocity will be added to the location previously calculated by the first computing logic 522, to compute the second location. But some variants are possible, for instance, based on a decision criterion, e.g. a threshold of the error budget or a determination that the receiver is deemed to be located in an area with a clear sky or not, a second location may be input from an external source, 540. The external source may be an inertial module collocated with the GNSS receiver, for instance an arrangement comprising one or more of an accelerometer, a gyroscope and a magnetometer, as available in a smart phone. The external source may also be the output of a map matching algorithm, as available in a car navigation system or a smart phone, or any other source of a position of a user or a device.

The second computing logic, 523, calculates the duty cycle and, in some of the embodiments of the invention, the error budgets at the epoch from data which may combine predetermined information coming from the parameters input with information coming from the GNSS receiver, for instance a configuration of the receiver (type or model of the antenna, type or model of the RF processing stage, type or model of the digital processing stage), a geometry of GNSS satellites in view of said GNSS receiver, as provided by a NMEA message, or a topology in an environment of said GNSS receiver, depending on an evaluation of how the received signals are affected by multipath, based on a map of multipath effects available in the table. The duty cycle and its possible sources of variation, as well as the power level may also be present in the tables. The second computing logic may also use the C/N0 values of the channels processing the satellites in view, said values provided by NMEA messages. It may also use the DOP, also provided by a NMEA message. It may also use the probability of a random walk of the integrated velocity. In an embodiment, the random walk of the integrated velocity may be modeled by an ellipsoid. In an embodiment, the first error budget is computed as the DOP multiplied by the UERE. In an embodiment, the second error budget is calculated as a product of the DOP multiplied by the UERRE, times the duration during which velocity has been integrated.

In an embodiment, the weighting factors of the first and the second locations are based only on the duty cycle, with an instantaneous shift, that may be determined by external conditions, or a smoothed shift, that me be determined by a logic.

In other embodiments, one or more of the first computing logic, 522, or of the second computing logic, 523, may be configured to compute a first weight of the first error budget and a second weight of the second error budget, calculated for instance as a percentage of the total error budget. The computing may be split between the first computing logic and the second computing logic to optimize the computation, without departing from the scope of the invention as claimed. The weights may be calculated as a proportion of each error budget in the total of the first and the second error budgets.

In an embodiment, the first weight equals a hundred percent if the first error budget is lower than or equal to a combination of the second error budget and a first threshold. The first threshold may be static and drawn from the tables in the parameters values, 521. The first threshold may also be modified dynamically as a function of the conditions of reception at the GNSS receiver drawn from NMEA messages.

In an embodiment, the second weight equals a hundred percent if the second error budget is lower than a combination of the first error budget and a second threshold. The second threshold may be static and drawn from the tables in the parameters values, 521. The second threshold may also be modified dynamically as a function of the conditions of reception at the GNSS receiver drawn from NMEA messages.

In some embodiments, the weights determined from the error budgets are combined with a duty cycle to determine a combined weight of three weights (the duty cycle and the two error budgets). The combination may be based on an assumption that the duty cycle takes precedence on the error budgets when one of these error budgets, or a ratio of the two, is below (or above) a threshold, as explained above.

According to the invention, the first computing logic is then caused to output a location of the GNSS receiver as a weighted average of the first location and of the second location. The output location is the navigation solution. In some embodiments, only the first location or only the second location is taken into account to output the location of the GNSS receiver, based on the duty cycle and/or relative values of the first and the second error budgets.

It is to be noted that good results may be obtained without external data, even if this data may improve the navigation solution. This is due to the fact that parameters which are readily available from the GNSS receiver through the interface 531, 532, such as DOP, C/N0, elevation of the satellites, may be used to adapt preset UERE and UERRE to compute first and second error budgets adapted to the actual conditions or reception of the GNSS signals. Also, in some embodiments, the duty cycle may be sufficient to provide an accurate navigation solution without taking the error budgets into account.

Figure 6:
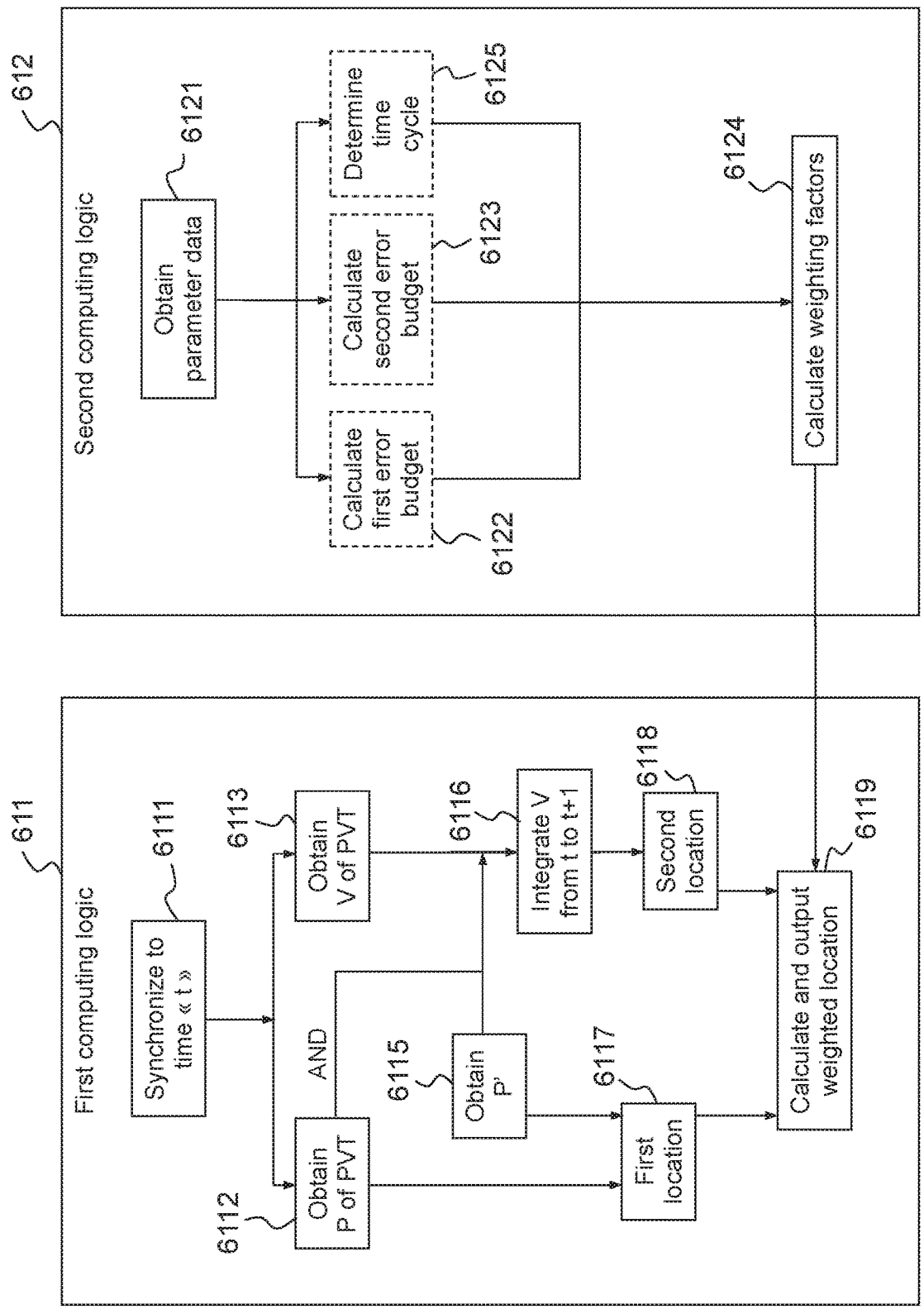
FIG. 6 represents a flow chart of processing steps of computing logics of a receiver of the invention in a number of its embodiments.

FIG. 6 represents a flow chart of processing steps of computing logics of a receiver of the invention in a number of its embodiments.

According to the invention, steps, 611, are performed in the first computing logic, 522.

A time reference t is obtained from the GNSS receiver at step 6111. On a cold start, time reference t will be an epoch after which a first P value with a confidence interval better than a threshold is obtained.

P is obtained from the PVT calculated from at least two frequencies by some channels of the digital processing stage of the GNSS receiver at step 6112.

At the same time reference, V is obtained from the PVT calculated from a single frequency signal by the same channels of the digital processing stage of the GNSS receiver at step 6113. V is integrated once at step 6116.

The improved position may thus be computed as:

$$P_{improved}(t+1) = P_{init} + \int_{t}^{t+1} V(\tau) \times d\tau$$

Pinit being P or P' at the starting time of improved position computation, or an averaged position obtained from several P or P' values over time.

In a variant of the invention, a position P' is obtained at step 6115 from an external source, as explained above in relation to FIG. 5. In this variant, a logic may be included in the first computing logic, to implement a decision criterion to select P or P' at time t. A decision criterion may take into account an accuracy of the GNSS position transmitted by an NMEA message.

Then, at step 6117 and 6118 respectively, a first location and a second location are computed.

At step 6119, the location which will be output as the navigation solution will be computed taking into account the first location, the second location and the weighting calculated either in the first computing logic (embodiment not represented on the figure) or in the second computing logic (as represented on the figure).

According to the invention, steps 612, are performed in the second computing logic, 523.

At step 6121, parameters values are obtained from the parameters input 521, either through the interface to the GNSS core receiver, 531, or through an external input, 540.

At step 6125, the duty cycle is used to determine when the first location or the second location, or a combination thereof should be used to determine the calculated location.

At optional steps 6122 and 6123, respectively, a first error budget and a second error budget may be computed, as explained above in relation with FIG. 5.

At step 6124, the weights of the duty cycle and/or the error budgets are computed to be passed to the first computing logic. Alternatively, the error budgets may be transferred to the first computing logic for it to compute the weights. In some options, the errors budgets may be the only parameters taken into account to calculate the weights, without using a duty cycle.

Figure 7:
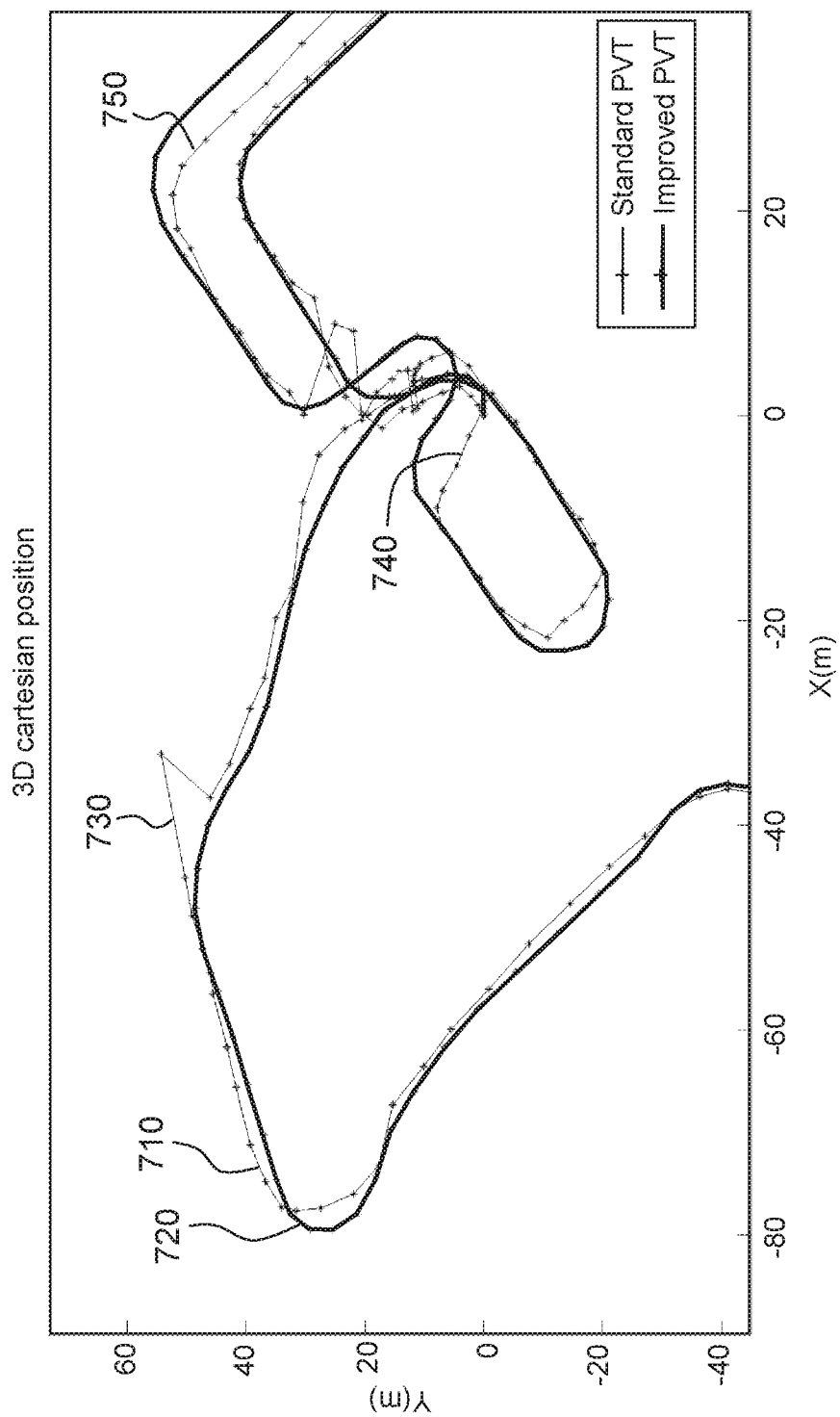
FIG. 7 illustrates a first example of a comparison of calculations of positions of a GNSS receiver of the prior art and of a GNSS receiver of the invention in a number of its embodiments.

FIG. 7 illustrates a first example of a comparison of calculations of positions of a GNSS receiver of the prior art and of a GNSS receiver of the invention in a number of its embodiments.

The case illustrated by FIG. 7 is a trajectory of an automotive vehicle in a suburb of a city where the density of buildings is rather low. Four constellations are acquired and tracked by the receiver (GPS, Glonass, Galileo, Beidou). The duration of the trajectory is about 50 minutes. Simplistic assumptions are made on the error budgets: the UERE is set at a fixed value of 1 m and the UERRE is set at a fixed value 0.1 m/s. In this case, no dynamic modification of the error budgets is added. In this example, a plain selection of P or integrated V is made based on the lower error budget:

the first location computed from P at step 6117 is selected as the navigation solution at a time determined by the duty cycle or if the first error budget is lower than the second error budget, or if the combination of the duty cycle and the error budgets so determines, as explained above;

the second location computed at step 6118 (as the previous first location to which a distance calculated by integration of V is added) is selected at a time determined by the duty cycle, or if the second error budget is lower than the first error budget, or if the combination of the duty cycle and the error budgets so determines, as explained above.

In FIG. 7, the trajectory of the vehicle calculated by a known multi-frequency GNSS receiver is represented by line 710. The trajectory of the vehicle calculated by a GNSS receiver to which an addition of the arrangement 520 configured according to the invention is represented by line 720.

It can be seen that line 710 demonstrates a number of errors 730, 740, 750 in the trajectory, which does not follow the road. This use case illustrates some of the advantages brought to the solutions of the prior art by a simplistic implementation of the invention, in some of its embodiments.

Figure 8:
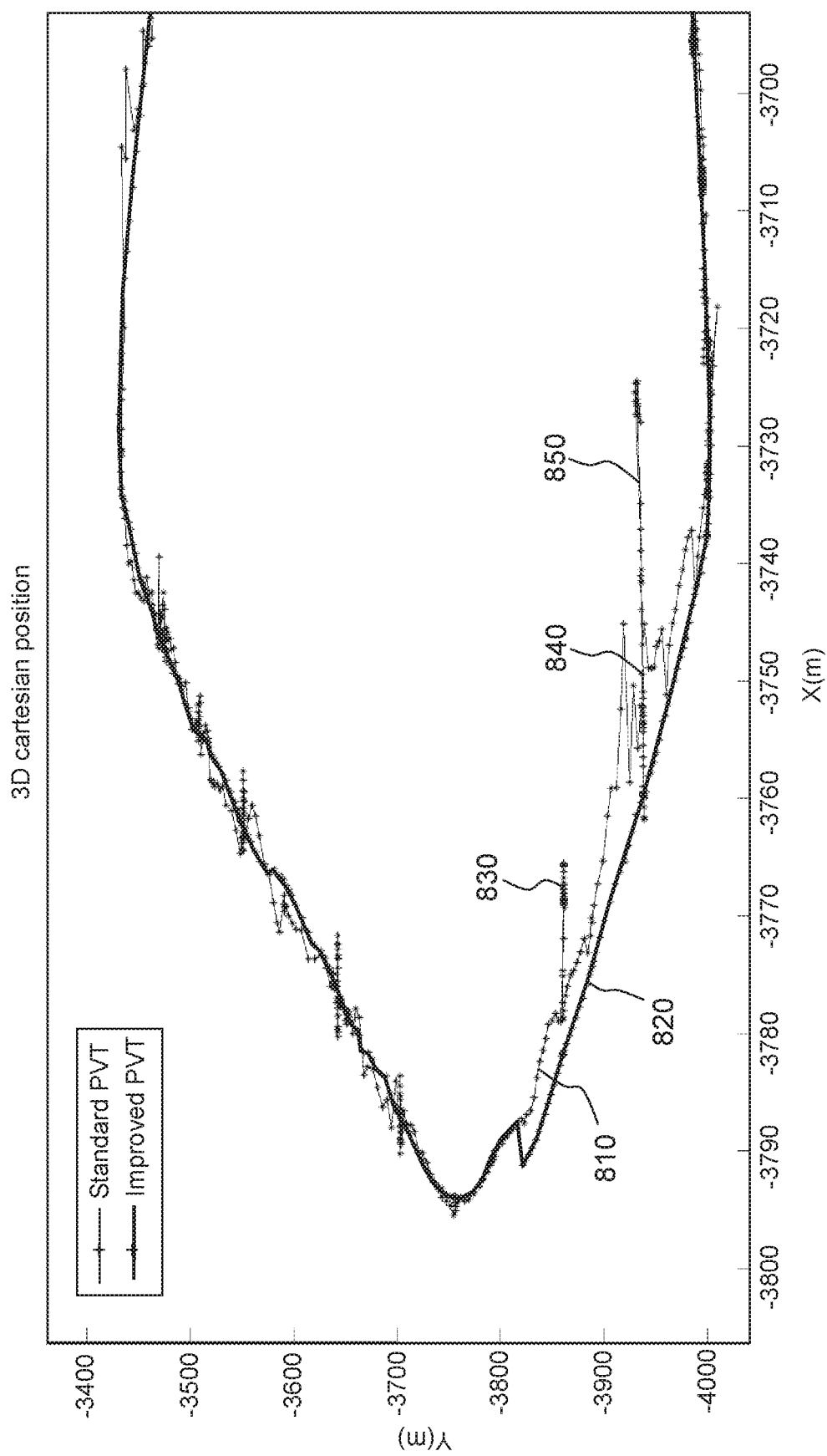
FIG. 8 illustrates a second example of a comparison of calculations of positions of a GNSS receiver of the prior art and of a GNSS receiver of the invention in a number of its embodiments.

FIG. 8 illustrates a second example of a comparison of calculations of positions of a GNSS receiver of the prior art and of a GNSS receiver of the invention in a number of its embodiments.

The case illustrated by FIG. 8 is a trajectory of an automotive vehicle in a centre of a city where the density of buildings is rather high. The receiver used and the GNSS constellations acquired and tracked are the same as for the case of FIG. 7. The duration of the trajectory in this case is about 1 h 45 minutes. Simple assumptions are made on the error budgets: the UERE is set at a fixed value of 2 m and the UERRE is set at a fixed value 0.2 m/s. The other conditions of the case of FIG. 8 are the same as those of FIG. 7.

In FIG. 8, the trajectory of the vehicle calculated by a multi-frequency GNSS receiver of the prior art is represented by line 810. The trajectory of the vehicle calculated by a GNSS receiver to which an addition of the arrangement 520 configured according to the invention is represented by line 820.

It can be seen that line 810 demonstrates a number of errors 830, 840, 850 in the trajectory, which does not follow the road. This use case further illustrates some of the advantages of the invention over the solutions of the prior art in a constrained environment by an implementation of the invention, in some of its embodiments.

It is remarkable that the invention provides not only a more accurate navigation solution, but also a smoother trajectory, since it is not affected by errors 830, 840 and 850.

The improvements described and claimed in some embodiments of the invention will still improve the navigation solution in comparison to the cases illustrated above. For instance, the integration of dynamic parameters representative of the conditions of reception at the GNSS receiver, or the weighting of the two location calculations based on their error budgets, or the integration of external navigation aids. It is remarkable that these improvements may be obtained with a standard GNSS receiver to which the invention may be added in a simple way.

Standard receivers are, for example, the ones marked as «recreational», «handheld», «navigation» «vehicle tracking» or «board for OEM apps» in the Receiver Survey 2015 database by GPSWorld, available at http://gpsworld.com/wp-content/uploads/2015/01/GPSWorld_2015ReceiverSurvey.pdf)

The invention was described above in a context of receivers using GNSS signals. It may also be applied with receivers using signals transmitted by pseudolites, for examples those marketed by Locata™.

According to the invention, vector V which is used to calculate the second location may also be used to determine a navigation heading which can be used either alone or in combination with outputs from other heading sensors, such as a magnetometer, or a combination of accelerometers and gyroscopes, or a map matching algorithm. The navigation heading may be used by applications, for instance to give a direction of a Point of Interest relative to the navigation heading. It can also be used to calibrate other heading sensors. This can be applied to a receiver used by a pedestrian or located in a manned or unmanned car, aircraft, or boat.

Thanks to the invention, it may be notably possible to incorporate a multi-frequency receiver in a portable device like a smart phone. Currently, due to the significant drain on power that a multi-frequency receiver entails, this type of receiver is not often implemented in a portable device. Thus, the invention has the significant advantage of allowing the provision of more accurate navigation solutions to a vast domain of applications.

In some embodiments of the invention, the receivers may establish connections with a server providing positioning services. The server may provide corrections of errors made in calculating the positions determined by the receiver. The server may provide corrections of atmospheric (ionospheric or troposheric) errors to subscribers of the positioning services. The server may collect GNSS measurements made by the receivers of the subscribers of the positioning services (PVT and/or pseudoranges and/or raw data, possibly together with indexes of quality of the measurements—SNR, C/N0, DOP, number of tracked satellites, etc.) and calculate corrections based on an estimation of errors determined at the receivers or at the server, notably taking into account code and phase data as disclosed by PCT application published as WO2016/034622 assigned to the same applicant or based on another method as a smoothing of the positions of the receivers in a defined area based on a majority vote among the combination of positions/errors in a defined area. In some variants, the server may only collect positions of receivers that are determined based on multi-frequency signals in a determined area, that are assumed to be more accurate than the positions determined by single-frequency receivers. The server may then transmit the corrections and/or accurate multi-frequency positions to the receivers of the subscribers (or only to the receivers whose positions are determined to be less accurate than the positions calculated by these receivers. Such embodiments may be implemented by using standard communication links between the receivers and the server (satellite, cellular, WiFi, wired, etc.).

The examples disclosed in this specification are only illustrative of some embodiments of the invention. They do not in any manner limit the scope of said invention which is defined by the appended claims.

The invention claimed is:

1. A GNSS receiver comprising:
   first computing logic configured to calculate a first location and a second location of the GNSS receiver, the first location based on position data in a PVT vector and calculated on one or more channels from a plurality of GNSS signals operating at two or more frequencies, the second location based on a result of an integration of velocity data in the PVT vector and calculated on the one or more channels from GNSS signals each operating at a single frequency;
   second computing logic configured to determine one or more weighting factors of the first location and the second location and to cause the first computing logic to output a calculated location of the GNSS receiver as a weighted average of the first location and the second location.

2. The GNSS receiver of claim 1, wherein the one or more weighting factors comprise a time cycle.

3. The GNSS receiver of claim 2, wherein the time cycle is predetermined based on an average duration of validity of an atmospheric correction.

4. The GNSS receiver of claim 3, wherein the predetermined time cycle is in-between 60 s and 300 s.

5. The GNSS receiver of claim 2, wherein the first weight is set to zero and the second weight is set to one in-between two successive instants of the predetermined time cycle, while the first weight is set to one and the second weight is set to zero at said two successive instants.

6. The GNSS receiver of claim 2, wherein the second computing logic is further configured to estimate a first error budget of the first location and a second weight of the second location and the one or more weighting factors are calculated by one or more of the first computing logic or the second computing logic, based on one or more of a predetermined time cycle, the first error budget or the second error budget.

7. The GNSS receiver of claim 1, wherein a first weight of the first location in the calculated location equals a proportion of the first error budget in the total of the first error budget and the second error budget and a second weight of the second location in the calculated location equals a proportion of the second error budget in the total of the first error budget and the second error budget.

8. The GNSS receiver of claim 1, wherein the first weight equals a hundred percent if the first error budget is lower than or equal to a combination of the second error budget and a first threshold value.

9. The GNSS receiver of claim 1, wherein the second weight equals a hundred percent if the second error budget is lower than a combination of the first error budget and a second threshold value.

10. The GNSS receiver of claim 1, wherein the second location uses, based on a decision criterion, one or more of: i) a calculated location of the GNSS receiver at an epoch before a current epoch as an initial value of the integration of the velocity data in the PVT vector or ii) a location of the GNSS receiver at a previous epoch input from positioning aids as an initial value of the integration of the velocity data in the PVT vector.

11. The GNSS receiver of claim 10, wherein the positioning aids comprise one or more of a map matching algorithm, an output of an inertial navigation system or a Wi-Fi localization system.

12. The GNSS receiver of claim 11, wherein the estimated error budgets depend upon one or more of a configuration of said GNSS receiver, a geometry of GNSS satellites in view of said GNSS receiver or a topology in an environment of said GNSS receiver.

13. The GNSS receiver of claim 11, wherein the estimated error budgets are estimated based on one or more of a Dilution Of Precision (DOP), a User Equivalent Range Error (UERE), a User Equivalent Range Rate Error (UERRE) or a probability estimate of a random walk of the integrated velocity along its path between a previous epoch and a current epoch.

14. The GNSS receiver of claim 13, wherein the first error budget equals the DOP multiplied by the UERE.

15. The GNSS receiver of claim 13, wherein the second error budget equals a product of the DOP multiplied by the UERRE, times the duration during which velocity has been integrated.

16. The GNSS receiver of claim 15, wherein the probability estimate of the random walk of the integrated velocity is modeled by an ellipsoid.

17. The GNSS receiver of claim 16, wherein one or more of the UERE and the UERRE are a combination of one or more of a parameter value, a carrier to noise ratio dependent value, an elevation dependent value or a signal dependent value.

18. The GNSS receiver of claim 17, wherein one or more of the first error budget or the second error budget are forecast estimated error budgets, said forecast being based on a combination of an estimated future trajectory of the GNSS receiver and a probability on said estimated future trajectory of one or more of a configuration of said GNSS receiver, a geometry of GNSS satellites in view of said GNSS receiver or a topology in an environment of said GNSS receiver.

19. The GNSS receiver of claim 18, wherein one or more of the UERE and the UERRE are predefined and stored in a database accessible by the first computing logic.

20. The GNSS receiver of claim 19, further comprising a third computing logic configured to calculate a heading information from the PVT vector.

21. A localization method using a GNSS receiver, the method comprising:
    calculating a first location and a second location of the GNSS receiver, the first location based on position data in a PVT vector calculated by the GNSS receiver on one or more channels from a plurality of GNSS signals operating at two or more frequencies, the second location based on a result of an integration of velocity data in the PVT vector and calculated on the one or more channels from GNSS signals each operating at a single frequency;
    determining one or more weighting factors of the first location and the second location and
    causing the first computing logic to output a calculated location of the GNSS receiver as a weighted average of the first location and the second location.

* * * * *